United States Patent
Huang et al.

(10) Patent No.: US 10,130,876 B2
(45) Date of Patent: Nov. 20, 2018

(54) JOYSTICK MODULE

(71) Applicant: PRIMAX ELECTRONICS LTD., Taipei (TW)

(72) Inventors: Shu-An Huang, Taipei (TW); Tsu-Hui Yu, Taipei (TW)

(73) Assignee: PRIMAX ELECTRONCIS LTD., Taipei (TW)

( * ) Notice: Subject to any disclaimer, the term of this patent is extended or adjusted under 35 U.S.C. 154(b) by 40 days.

(21) Appl. No.: 15/195,559

(22) Filed: Jun. 28, 2016

(65) Prior Publication Data

US 2017/0304717 A1    Oct. 26, 2017

(30) Foreign Application Priority Data

Apr. 22, 2016  (TW) .............................. 105112639 A (51) Int. Cl.
  G06F 3/0338   (2013.01)
  A63F 13/24    (2014.01)
  G06F 3/038    (2013.01)

(52) U.S. Cl.
  CPC ............ *A63F 13/24* (2014.09); *G06F 3/0338* (2013.01); *G06F 3/0383* (2013.01)

(58) Field of Classification Search
  CPC ....... A63F 13/24; G06F 3/0338; G06F 3/0383
  See application file for complete search history.

(56) References Cited

U.S. PATENT DOCUMENTS

| 5,491,462 A * | 2/1996 | Cecchi | G05G 9/047 338/128 |
| 2012/0274563 A1* | 11/2012 | Olsson | G05G 9/047 345/161 |
| 2015/0364918 A1* | 12/2015 | Singh | G05F 1/67 307/78 |
| 2016/0287986 A1* | 10/2016 | Sidwell | A63F 13/24 |
| 2016/0346680 A1* | 12/2016 | Tsai | A63F 13/24 |
| 2016/0346681 A1* | 12/2016 | Tsai | A63F 13/24 |
| 2016/0361634 A1* | 12/2016 | Gassoway | A63F 13/24 |
| 2016/0361636 A1* | 12/2016 | Gassoway | A63F 13/24 |

* cited by examiner

*Primary Examiner* — Jason Skaarup
(74) *Attorney, Agent, or Firm* — Kirton McConkie; Evan R. Witt (57) ABSTRACT

A joystick module includes a base, a joystick body, a joystick cover and a second protruding edge. The base includes a casing and a first protruding edge. A top part of the casing has an opening. The first protruding edge is formed on a periphery of the opening of the casing. The joystick body is installed in the base. A first end of the joystick body is protruded through the opening so as to be rotated. The joystick cover is installed in the base and connected with the joystick body. In response to a rotation of the joystick body, the joystick cover is correspondingly rotated. During the rotation of the joystick body, a part of the second protruding edge is contacted with an inner surface of the casing. When the part of the second protruding edge is contacted with a part of the first protruding edge, the rotation of the joystick body is limited.

8 Claims, 6 Drawing Sheets

JOYSTICK MODULE

FIELD OF THE INVENTION

The present invention relates to a joystick module, and more particularly to a joystick module for preventing scratch generation of a joystick cover because of a rubbing action in order to maintain normal rotation.

BACKGROUND OF THE INVENTION

A video game console or an electronic gaming machine is one of the electronic entertainment devices that are familiar to people. In views of the consumer trends in the market and the content development of the electronic games, a lot of electronic games are creative and provide various kinds of operations on the sensory experience or even provide simulation trainings of related technologies. In other words, these devices are suitably used by people of all ages. Consequently, the video game console or the electronic gaming machine becomes an indispensable electronic device for people.

Conventionally, a handle device is used to operate these electronic entertainment devices. The handle device is in communication with a host in a wired connection manner or a wireless connection manner. The handle device is a human-machine interface that provides an ergonomic grip (e.g., in a single hand or both-hands) and is able to control the game or the application program under execution. A direction control function is one of the important functions of the handle device. The handle device has many types. For example, a cross-shaped direction key assembly, a four direction key assembly (i.e., in the up, down, left and right directions) and a trackball are examples of the handle device. A joystick is also a common design of the handle device.

The joystick is an operating lever for controlling directions. According to the number of axes to be controlled, joysticks are classified into three types, including a single-axis joystick, a two-axis joystick and a three-axis joystick. The single-axis joystick allows for the operations in two directions. The two-axis joystick allows for the operations in four directions. The three-axis joystick allows for the operations in all directions (i.e., 360 degrees). Moreover, according to the shapes, the joystick can be operated in a single finger (e.g., a thumb) or the joystick can be held by a palm. Consequently, the user can control directions in various games or application programs.

Figure 1A:
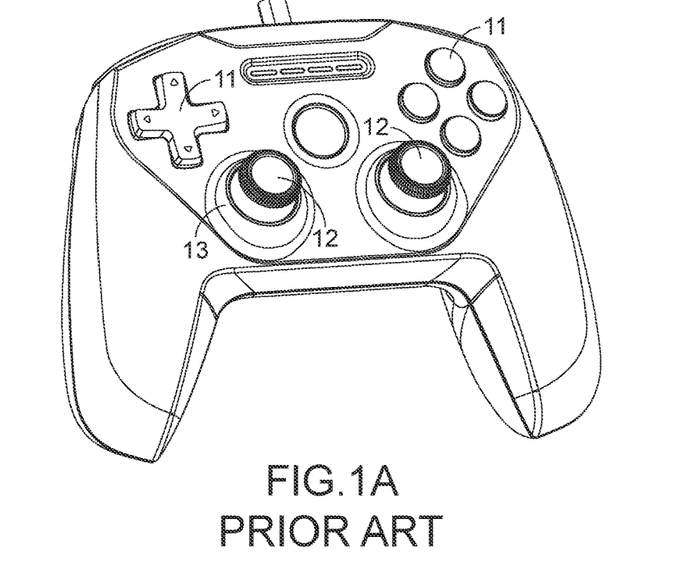
FIG. 1A is a schematic perspective view illustrating a conventional handle device.

FIG. 1A is a schematic perspective view illustrating a conventional handle device. As shown in FIG. 1A, the handle device 10 is held by both hands. The handle device 10 is equipped with plural operation buttons 11 and two joysticks 12. These joysticks 12 are three-axis joysticks that can be rotated at 360 degrees to control the directions by the thumbs of the left hand and the right hand of the user according to the usual practice.

Figure 1B:
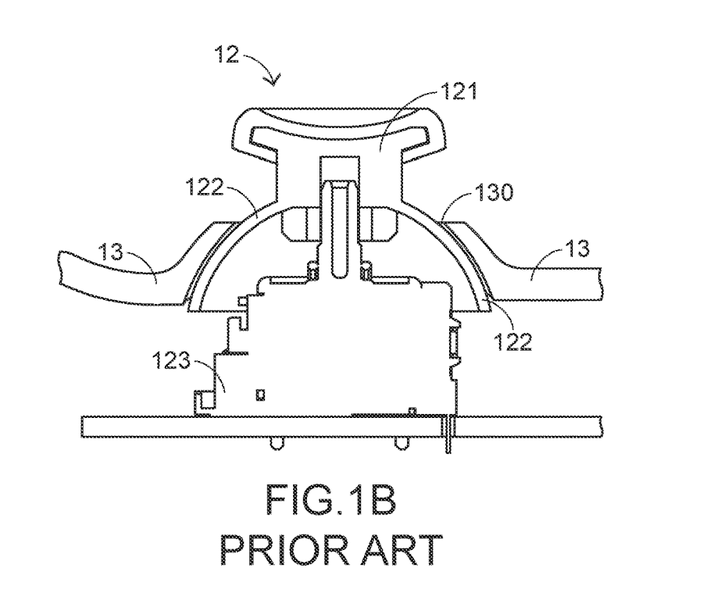
FIG. 1B is a schematic side cross-sectional view illustrating a joystick module of the handle device of FIG. 1A.

FIG. 1B is a schematic side cross-sectional view illustrating a joystick module of the handle device of FIG. 1A. As shown in FIG. 1B, the joystick module 12 comprises a joystick body 121, a joystick cover 122 and a sensing element 123. The joystick body 121 is disposed over the sensing element 123 and the joystick cover 122. As the joystick body 121 is rotated, the joystick cover 122 is correspondingly rotated. Consequently, the rotation of the joystick body 121 can be sensed by the sensing element 123.

Please refer to FIGS. 1A and 1B again. The joystick module 12 is installed in a base 13 of the handle device 10. The base 13 is protruded from the periphery of the joystick module 12 and arranged around the joystick module 12. Moreover, the joystick body 121 is protruded through an opening 130 in a middle region of the base 13. The base 13 is used for limiting the rotating degree of the joystick body 121. Moreover, both of the base 13 and the joystick cover 122 can prevent external dust from entering the sensing element 123 so as to protect the sensing element 123.

Conventionally, the joystick cover 122 is contacted with and covered by the base 13. Consequently, while the joystick body 121 is rotated, the joystick cover 122 is continuously contacted with an inner side of the base 13. That is, the joystick cover 122 and the inner side of the base 13 are rubbed against each other. If the joystick module 12 has been used for a long time, many non-uniform scratches are formed on the joystick cover 122 or the inner side of the base 13. Due to these scratches, the surface structure is not aesthetically pleasing. If the damaged condition reaches a certain extent, the rotating function of the joystick body 121 is adversely affected. For example, if the rotation is not smooth or the rotation is stuck, the handle device cannot be normally operated to control the desired direction or the controlled direction cannot be accurately recognized.

SUMMARY OF THE INVENTION

An object of the present invention provides a joystick module. A joystick cover of the joystick module has a protruding edge. During rotation of a joystick body, the protruding edge can prevent the base of the joystick module from rubbing against the joystick cover. Consequently, the undesired scratches are not generated.

In accordance with an aspect of the present invention, there is provided a joystick module. The joystick module includes a base, a joystick body, a joystick cover and a second protruding edge. The base includes a casing and a first protruding edge. A top part of the casing has an opening. The first protruding edge is formed on a periphery of the opening of the casing. The joystick body is installed in the base. A first end of the joystick body is protruded through the opening so as to be rotated. The joystick cover is installed in the base and connected with the joystick body. In response to a rotation of the joystick body, the joystick cover is correspondingly rotated. The second protruding edge is formed on a bottom periphery of the joystick cover. An orientation of the second protruding edge faces an orientation of the first protruding edge. During the rotation of the joystick body, a part of the second protruding edge is contacted with an inner surface of the casing. When the part of the second protruding edge is contacted with a part of the first protruding edge, the rotation of the joystick body is limited.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings. In the following embodiments and drawings, the elements irrelevant to the concepts of the present invention are omitted and not shown.

Figure 2A:
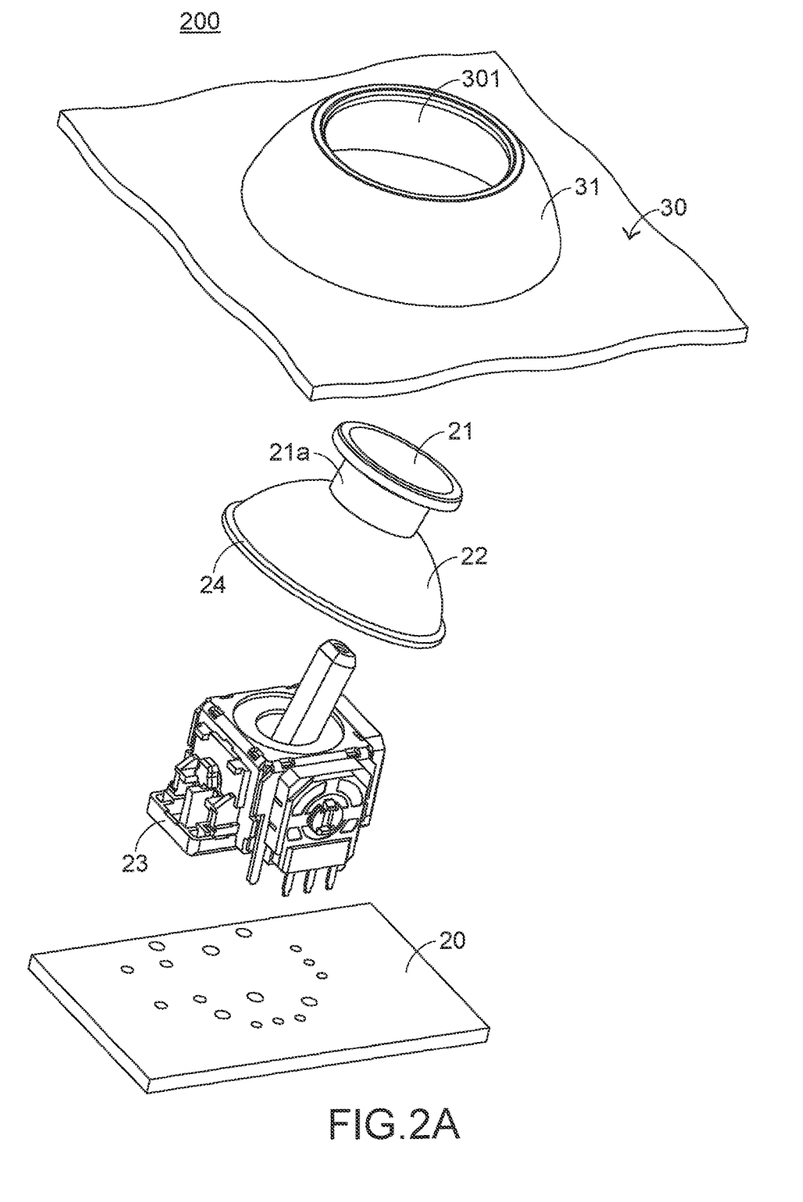
FIG. 2A is a schematic exploded view illustrating a joystick module according to an embodiment of the present invention.
Figure 2B:
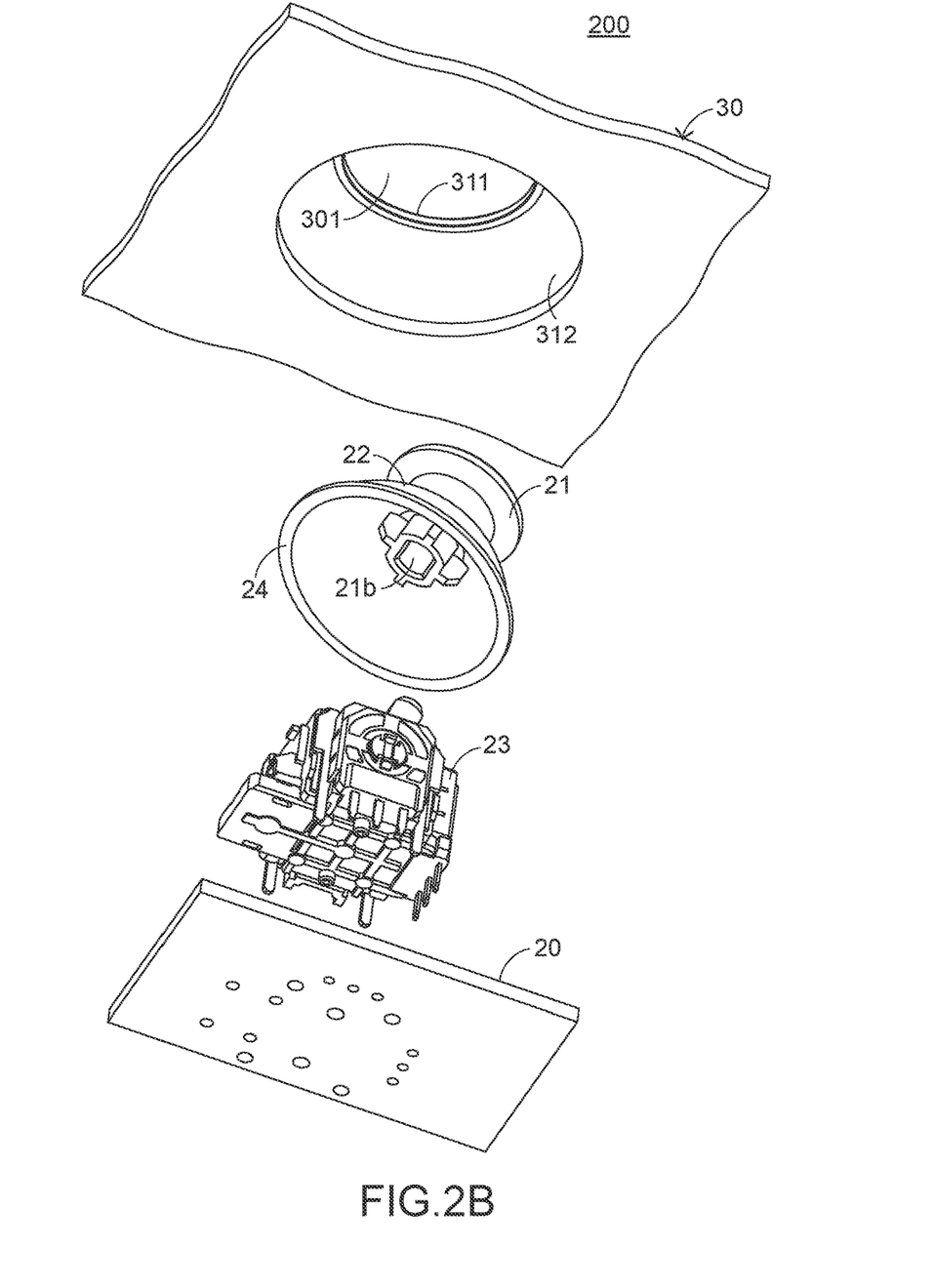
FIG. 2B is a schematic exploded view illustrating the joystick module of FIG. 2A and taken along another viewpoint.
Figure 3A:
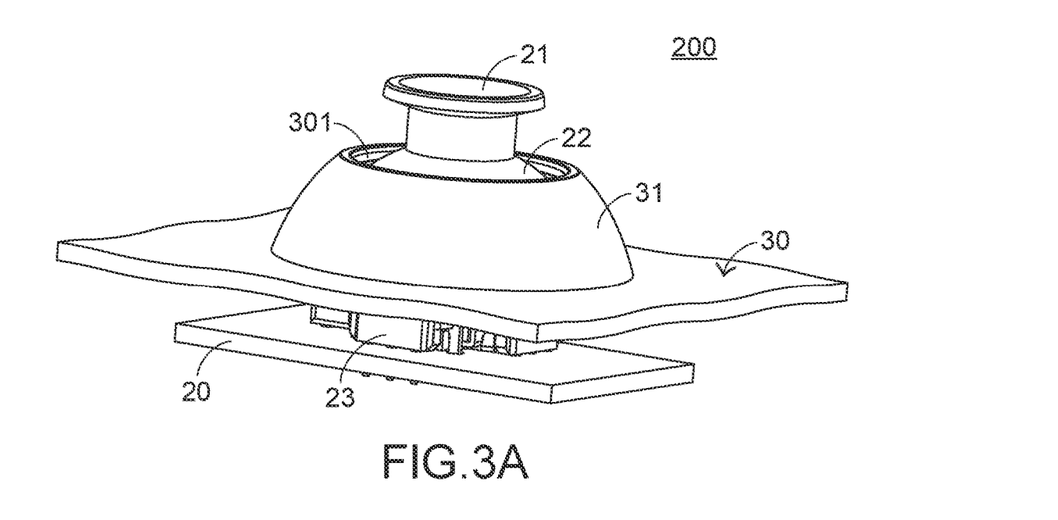
FIG. 3A is a schematic assembled view illustrating the joystick module according to the embodiment of the present invention.
Figure 3B:
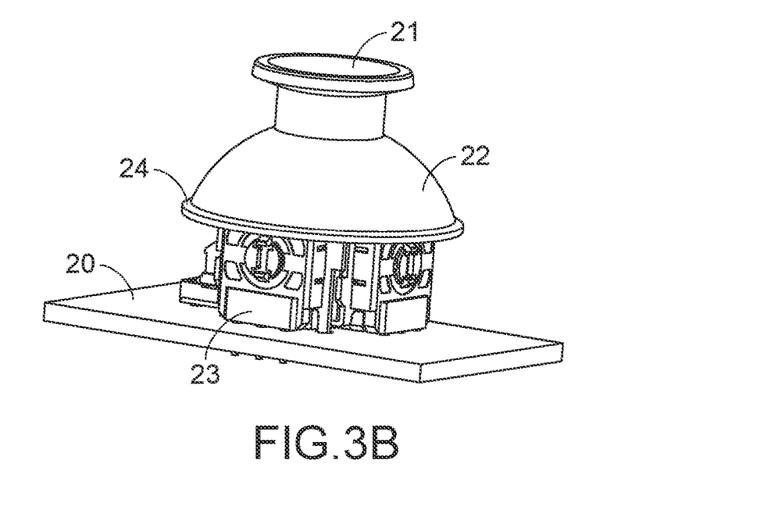
FIG. 3B is a schematic assembled view illustrating portion of the joystick module of FIG. 3A.

The present invention provides a joystick module. An example of the joystick module will be illustrated with reference to FIGS. 2A, 2B, 3A and 3B. FIG. 2A is a schematic exploded view illustrating a joystick module according to an embodiment of the present invention. FIG. 2B is a schematic exploded view illustrating the joystick module of FIG. 2A and taken along another viewpoint. FIG. 3A is a schematic assembled view illustrating the joystick module according to the embodiment of the present invention. FIG. 3B is a schematic assembled view illustrating portion of the joystick module of FIG. 3A. The joystick module 200 is applied to a handle device or an operating lever device (not shown). When an application program is executed, the joystick module 200 can be used to perform a direction control operation.

In case that the joystick module 200 is installed on a handle device, the user can hold the handle device in a single hand or both hands and operate the joystick module 200 with a single finger. The handle device is in communication with a host. When the application program is executed in the host, the joystick module 200 can be used to perform the direction control operation. The operating lever device is operated with a palm of the user. A flight simulator is an example of the operating lever device. Moreover, the host is also in communication with a display device. The user can watch the operations of the operating lever device through the display device.

Please refer to the above drawings again. The joystick module 200 comprises a base 30, a joystick body 21, a joystick cover 22, a sensing element 23 and a circuit board 20. The joy stick body 21, the joystick cover 22 and the sensing element 23 are installed in the base 30. The joystick cover 22 is connected with the joystick body 21. The joystick body 21 is also connected with the sensing element 23. The sensing element 23 is disposed on the circuit board 20. Moreover, the joystick body 21 can be rotated by the user. As the joystick body 21 is rotated, the joystick cover 22 is correspondingly rotated. By sensing the rotation of the joystick body 21, the sensing element 23 generates a corresponding direction control command.

In this embodiment, the base 30 comprises a casing 31 and a first protruding edge 311. A top part of the casing 31 has a ring-shaped opening 301. The first protruding edge 311 is formed on a periphery of the opening 301. An inner surface 312 of the casing 31 is arc-shaped. For assembling the joystick module 200, a first end 21a of the joystick body 21 is protruded through the opening 301, and a second end 21b of the joystick body 21 is connected with the sensing element 23. In this embodiment, the joystick body 21 and the sensing element 23 are cooperated to provide a function of a three-axis joystick. That is, the joystick body 21 can be rotated within the range of the opening 301 at 360 degrees.

In accordance with a feature of the present invention, the joystick module 200 further comprises a second protruding edge 24. The second protruding edge 24 is formed on a bottom periphery of the joystick cover 22. While the joystick body 21 is rotated, the second protruding edge 24 is served as a buffering structure for buffering the contact between the joystick cover 22 and the inner surface 312 of the casing 31. Consequently, the inner surface 312 of the casing 31 is contacted with and rubbed against the joystick cover 22 to a smaller extent. Like the opening 301, the second protruding edge 24 is also ring-shaped. More preferably, the opening 301, the first protruding edge 311 and the second protruding edge 24 have circular profiles. Consequently, the joystick module 200 can provide the identical control extent in all rotating directions.

In this embodiment, the second protruding edge 24, the joystick body 21 and the joystick cover 22 are made of the same material and integrally formed with each other. Please refer to FIGS. 2A and 2B again. An inner portion of the joystick cover 22 has an accommodation space. The first end 21a of the joystick body 21 is located at the top side of the joystick cover 22. The second end 21b of the joystick body 21 is protruded through the inner portion of the joystick cover 22 and connected with the sensing element 23. In other words, the joystick cover 22 has the shape of an inverted bowl. Moreover, an outer surface of the joystick cover 22 is arc-shaped. The second protruding edge 24 is protruded from the periphery of the joystick cover 22.

Moreover, the size of the casing 31 is larger than the size of the joystick cover 22. Consequently, the joystick cover 22 is accommodated within the casing 31. For providing the identical control extent in all rotating directions, the initial position of the joystick cover 22 and the initial position of the joystick body 21 are located at a center of the base 30 (or the opening 301). For allowing the second protruding edge 24 to provide more uniform contact force to the inner surface 312 of the casing 31 during rotation, the radian of the joystick cover 22 and the radian of the inner surface 312 of the casing 31 are identical. Preferably, the joystick cover 22 and the inner surface 312 of the casing 31 have spherical radians.

The operations and the structures of the components of the joystick module in response to the rotation of the joystick body 21 will be illustrated in more details as follows.

Figure 4A:
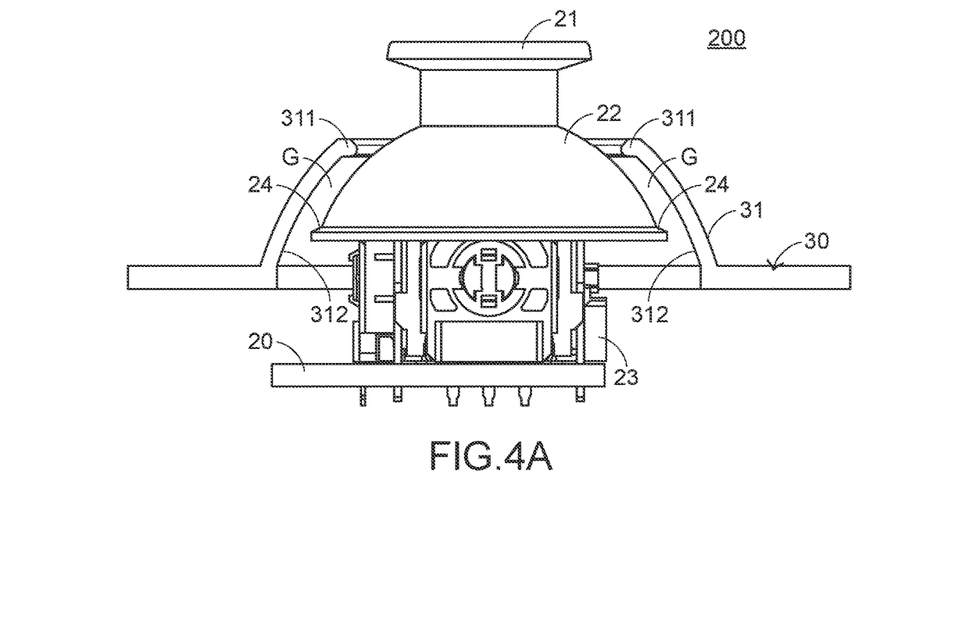
FIG. 4A is a schematic side cross-sectional view of the joystick module when the joystick body is at a center of the base.
Figure 4B:
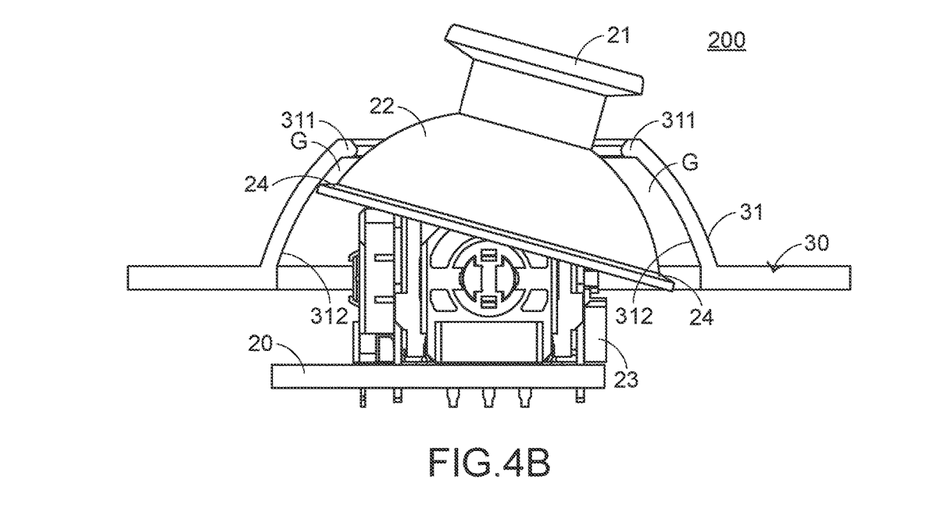
FIG. 4B is a schematic side cross-sectional view of the joystick module while the joystick body is rotated.
Figure 4C:
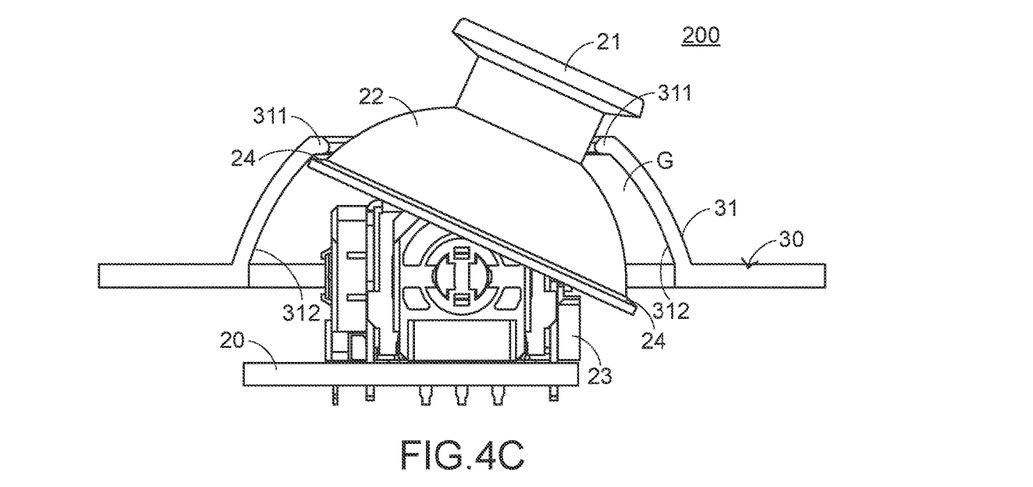
FIG. 4C is a schematic side cross-sectional view of the joystick module when the joystick body is rotated at the largest tilt angle.
Figure 4D:
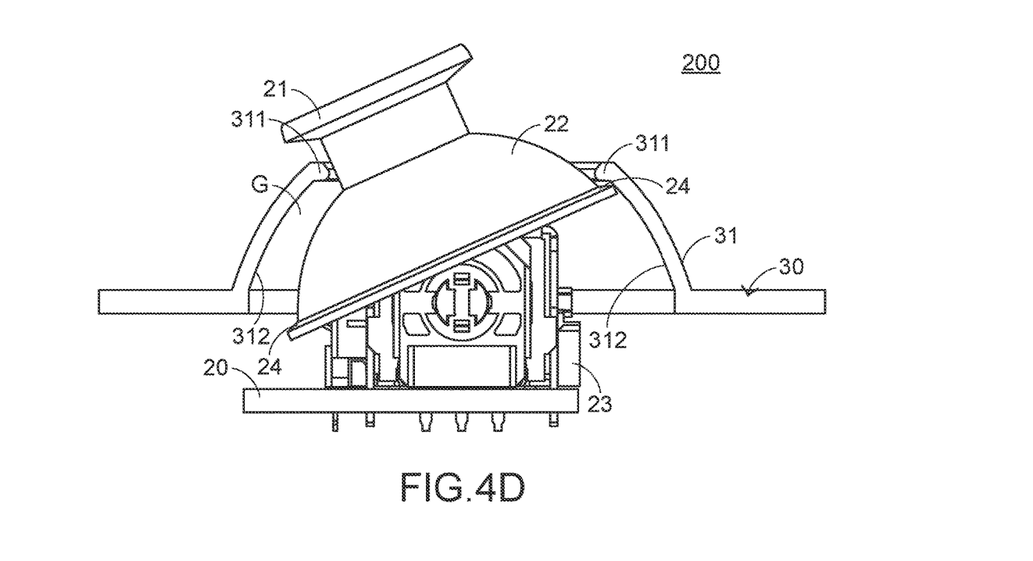
FIG. 4D is a schematic side cross-sectional view of the joystick module when the joystick body is rotated at the largest tilt angle and in the direction reverse to FIG. 4C.

Please refer to FIGS. 4A-4D. FIG. 4A is a schematic side cross-sectional view of the joystick module when the joystick body is at a center of the base. FIG. 4B is a schematic side cross-sectional view of the joystick module while the joystick body is rotated. FIG. 4C is a schematic side cross-sectional view of the joystick module when the joystick body is rotated at the largest tilt angle. FIG. 4D is a schematic side cross-sectional view of the joystick module when the joystick body is rotated at the largest tilt angle and in the direction reverse to FIG. 4C.

As shown in FIG. 4A, the joystick body 21 and the joystick cover 22 are located at the center of the opening 301 of the base 30. In this situation, the joystick body 21 is not rotated. Meanwhile, the joystick body 21 is not inclined relative to a normal line of the circuit board 20, and the second protruding edge 24 on the joystick cover 22 is in parallel with the circuit board 20. In this situation, there is a gap G between the inner surface 312 of the casing 31 and the joystick cover 22. Moreover, the first protruding edge 311 is not contacted with the joystick cover 22, and the second protruding edge 24 is not contacted with the inner surface 312 of the casing 31. That is, there is a tiny spacing interval between the second protruding edge 24 and the inner surface 312 of the casing 31. Alternatively, in case that a more precise mechanical and machined technology is provided, the second protruding edge 24 is contacted with the inner surface 312 of the casing 31 in this situation.

Then, as shown in FIG. 4B, the joystick body 21 is rotated by the user. Meanwhile, the joystick body 21 is inclined relative to a normal line of the circuit board 20. As shown in FIG. 4B, the joystick body 21 is inclined toward the right side. In case that the sizes of components and the relationships between these components are identical to those mentioned above, the first protruding edge 311 is not contacted with the joystick cover 22 during the rotation of the joystick body 21. Moreover, while the joystick body 21 is rotated, the joystick cover 22 is correspondingly rotated. Consequently, the second protruding edge 24 on the joystick cover 22 is also inclined relative to the circuit board 20. In this embodiment, a part of the second protruding edge 24 (i.e., the left part of the second protruding edge 24 as shown in FIG. 4B) is moved upwardly to be contacted with the inner surface 312 of the casing 31. Moreover, another part of the second protruding edge 24 (i.e., the right part of the second protruding edge 24 as shown in FIG. 4B) is moved downwardly and away from the inner surface 312 of the casing 31.

It is noted that numerous modifications and alterations may be made while retaining the teachings of the invention. For example, in another embodiment, the outer surface of the second protruding edge 24 is arc-shaped. Consequently, when the second protruding edge 24 is contacted with and moved on the inner surface 312 of the casing 31, the generated drag force is reduced and the rotation of the joystick body 21 is smoother. Moreover, as the joystick body 21, the size of the gap G between the inner surface 312 of the casing 31 and the joystick cover 22 is correspondingly changed. In comparison with the gap as shown in FIG. 4A, the gap G at the left side of FIG. 4B is smaller, and the gap G at the right side of FIG. 4B is larger or becomes an open space.

Then, as shown in FIG. 4C, the joystick body 21 is continuously rotated by the user in the rotating direction of FIG. 4B. Meanwhile, a part of the second protruding edge 24 is contacted with the first protruding edge 311. In accordance with another feature of the present invention, the rotation of the joystick body 21 is limited by the first protruding edge 311. Particularly, according to the configuration, the orientation of the second protruding edge 24 faces the orientation of the first protruding edge 311. That is, the first protruding edge 311 is protruded internally toward the joystick body 21, and the second protruding edge 24 is protruded externally toward the casing 31. In case that the sizes of components and the relationships between these components are identical to those mentioned above, the second protruding edge 24 is continuously moved upwardly to be contacted with the first protruding edge 311.

As mentioned above, the joystick cover 22 is correspondingly rotated and inclined. Consequently, when the joystick body 21 is rotated at the largest tilt angle, a part of the second protruding edge 24 (i.e., the left part of the second protruding edge 24 as shown in FIG. 4C) is contacted with a part of the first protruding edge 311 (i.e., the left part of the first protruding edge 311 as shown in FIG. 4C). Since the gap G at the corresponding position is no longer present, the rotation of the joystick body 21 is limited. Since there is a tiny spacing interval between the left part of the first protruding edge 311 and the joystick cover 22, the first protruding edge 311 is not contacted with and rubbed against the joystick cover 22. Although the right part of the first protruding edge 311 is not contacted with the joystick cover 22, the distance between the right part of the first protruding edge 311 and the joystick cover 22 is reduced.

In an embodiment, the largest tilt angle of the joystick body 21 is about 22 degrees. That is, the joystick body 21 can be rotated in all directions (i.e., 360 degrees) while the tilt angle of the joystick body 21 is within this limited range. Moreover, the largest tilt angle of the joystick body 21 is related with the diameter of the opening 301, the height of the first protruding edge 311, the width of the joystick cover 22, the diameter of the joystick body 21 or the size features of other components.

For example, if the opening of the base is smaller than the above embodiment, the first protruding edge is at a higher position. Consequently, before a part of the second protruding edge is contacted with the corresponding first protruding edge, the joystick body is contacted with another part of the first protruding edge to limit rotation of the joystick body. Regardless of whether the second protruding edge is contacted with the first protruding edge or the joystick body is contacted with the first protruding edge, the rotation of the joystick body is limited. That is, the above designs are feasible.

As shown in FIG. 4D, the joystick body is rotated at the largest tilt angle and in the direction reverse to FIG. 4C. In case that the positions, sizes and shapes of associated structures or components are symmetric with respect to each other, the rotation of FIG. 4D is similar to the rotation of FIG. 4C. Consequently, the detailed descriptions thereof are omitted.

From the above descriptions, the present invention provides a joystick module. The joystick module can be effectively applied to a handle device or an operating lever device that is known in the art. As mentioned above, the conventional joystick module has many drawbacks such as the damage of the joystick cover because of the rubbing action, the generation of the aesthetically-unpleasing scratches or the impaired rotating efficacy. The joystick module of the present invention can solve the drawbacks of the conventional technologies while achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A joystick module, comprising:
   a base comprising a casing and a first protruding edge, wherein a top part of the casing has an opening, and the first protruding edge is formed on an inner periphery of the opening of the casing;
   a joystick body installed in the base, wherein a first end of the joystick body is protruded through the opening so as to be rotated;
   a joystick cover installed in the base and connected with the joystick body, wherein in response to a rotation of the joystick body, the joystick cover is correspondingly rotated; and
   a second protruding edge formed on a bottom outer periphery of the joystick cover,
   wherein when the joystick body is not rotated, the joystick body and the joystick cover are located at a center of the opening of the casing, and wherein the first protruding edge protrudes towards the center of the opening and the second protruding edge protrude away from the center of the opening, so that during the rotation of the joystick body, a part of the second protruding edge contacts an inner surface of the casing, wherein when the part of the second protruding edge contacts a part of the first protruding edge, the rotation of the joystick body is limited.

2. The joystick module according to claim 1, further comprising a sensing element, wherein the sensing element is disposed within the base and connected with a second end of the joystick body, and an extent of the rotation of the joystick body is sensed by the sensing element.

3. The joystick module according to claim 1, wherein the joystick module is installed in a handle device or an operating lever device, wherein when an application program is executed, the joystick module performs a direction control operation.

4. The joystick module according to claim 1, wherein when the joystick body is in the center of the opening or while the joystick body is rotated, the first protruding edge is not contacted with the joystick cover.

5. The joystick module according to claim 1, wherein when the joystick body is in the center of the opening, the second protruding edge is not contacted with the inner surface of the casing.

6. The joystick module according to claim 1, wherein the inner surface of the casing and the joystick cover are arc-shaped, and a gap is formed between the inner surface of the casing and the joystick cover, wherein while the joystick body is rotated, a size of the gap is correspondingly changed.

7. The joystick module according to claim 1, wherein the second protruding edge, the joystick body and the joystick cover are made of the same material and integrally formed with each other, wherein an outer surface of the joystick cover is arc-shaped.

8. The joystick module according to claim 1, wherein the first protruding edge is protruded toward the joystick body, and the second protruding edge is protruded toward the casing.

* * * * *